United States Patent
Ramberg

(10) Patent No.: US 8,364,622 B1
(45) Date of Patent: Jan. 29, 2013

(54) DETERMINING TRAITS FROM SAMPLE EVENTS

(76) Inventor: Charles E. Ramberg, Los Altos Hills, CA (US)

( * ) Notice: Subject to any disclaimer, the term of this patent is extended or adjusted under 35 U.S.C. 154(b) by 0 days.

(21) Appl. No.: 13/398,546

(22) Filed: Feb. 16, 2012

Related U.S. Application Data

(63) Continuation of application No. 12/355,719, filed on Jan. 16, 2009, now Pat. No. 8,150,786, which is a continuation of application No. 12/185,770, filed on Aug. 4, 2008, now abandoned.

(60) Provisional application No. 60/963,091, filed on Aug. 3, 2007.

(51) Int. Cl.
*G06F 17/00* (2006.01)

(52) U.S. Cl. ........................................................ 706/45

(58) Field of Classification Search .................... 706/12, 706/20, 45, 62
See application file for complete search history.

(56) References Cited

PUBLICATIONS

Boulis, Clustering of Cepstrum Coefficients Using Pairwise Mutual Information, 2002, U of Washington, pp. 1-7.*
Martignon et al., Neural Coding: Higher Order Temporal Patterns in the Neurostatistics of Cell Assemblies, 2000, Neural Comput. pp. 1-59.*
Skillicorn, Social Network Analysis via Matrix Decompositions, IEEEE, Chapter 19, pp. 367-391.*
Csenki, Reconstruction of siffraction space from noisy diffraction images, 2004, Uppsala, pp. 1-50.*
Carniero et al., Flexible Spatial Models for Grouping Local Image Features, 2004, CVPR, pp. 1-8.*
Wang et al., Clustering by Pattern Similarity in LArge Data Sets, 2002, ACM SIGMOD, pp. 394-405.*

* cited by examiner

*Primary Examiner* — David Vincent

(57) ABSTRACT

Various aspects provide for receiving data associated with a plurality of samples. A sample generally includes data associated with one or more events. One or more traits may be determined, where a trait may be a set of or associated with one or more events. Generally, events included in a trait may be correlated (including anti-correlated) in some way. A trait may be associated with a sample, and the association may be recorded, an action may be triggered, and/or a user may be notified.

23 Claims, 1 Drawing Sheet

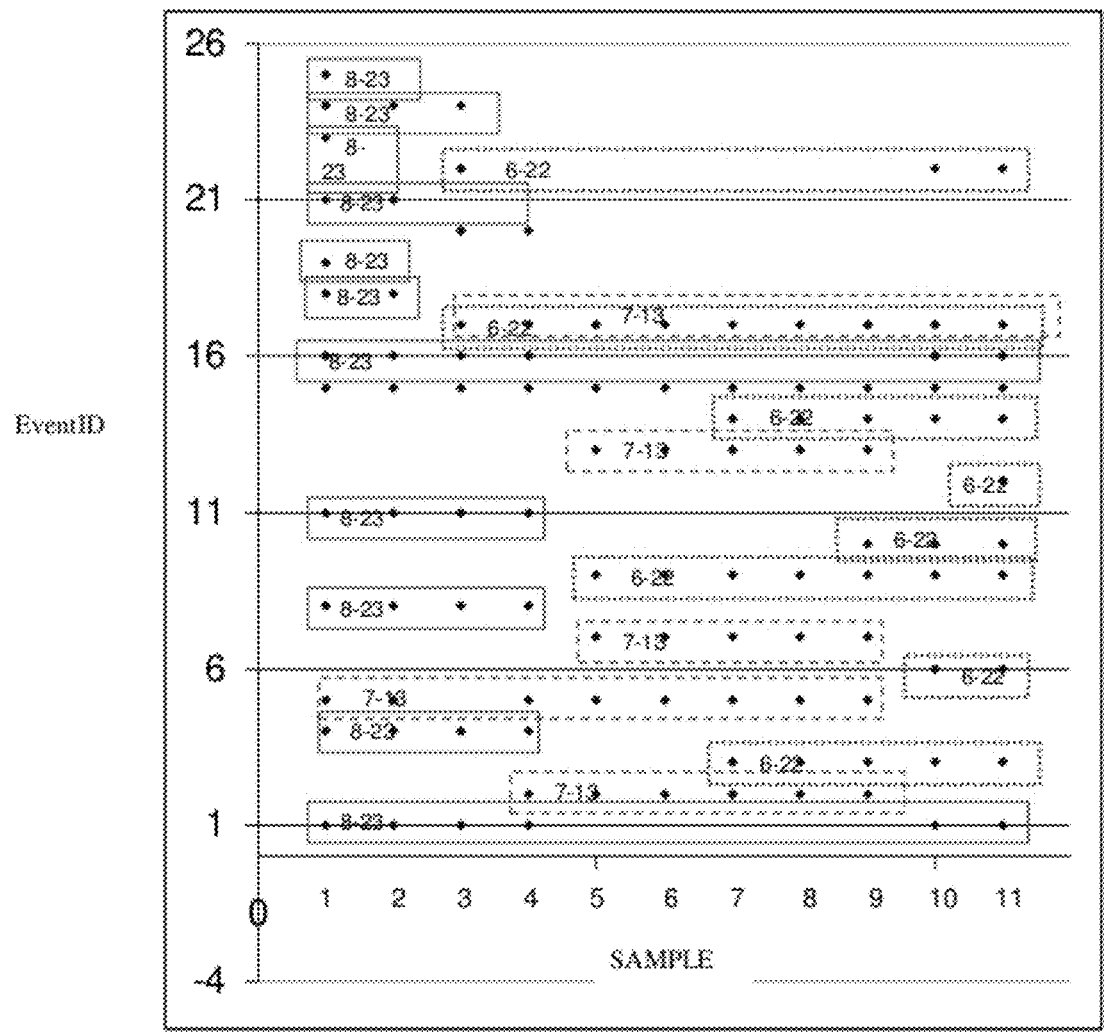

DETERMINING TRAITS FROM SAMPLE EVENTS

CROSS REFERENCE TO RELATED APPLICATIONS

The present application is a continuation of U.S. patent application Ser. No. 12/355,719, filed Jan. 16, 2009 now U.S. Pat. No. 8,150,786, which is a continuation of U.S. patent application Ser. No. 12/185,770, filed Aug. 4, 2008, now abandoned which claims the priority benefit of U.S. provisional patent application No. 60/963,091, filed Aug. 3, 2007, entitled "Data Processing Method," the disclosures of which are incorporated herein by reference.

BACKGROUND

1. Technical Field

The present invention relates generally to data processing.

2. Description of Related Art

Various methods exist to deconvolute data. Generally, many sources of data include multiple traits. Deconvoluting a response associated with a sample, particularly a sample having multiple and/or complex traits, may be challenging.

Increasing number and dimensionality of data may provide rich information. Combinatorial libraries, online behavior databases, large marketplaces and other sources of large amounts of data may yield information about traits associated with certain responses. However, analyzing large, complex sets of data may be challenging. Many analytical methods examine data on a "sample by sample" basis, which may not leverage information that may be present across a plurality of samples, particularly when the plurality of samples includes some degree of diversity with respect to one or more traits.

SUMMARY OF THE INVENTION

Various aspects provide for receiving data associated with a plurality of samples. A sample may generally include data associated with one or more events. One or more traits may be determined, where a trait may be a set of or associated with one or more events. Generally, events included in a trait may be correlated (including anti-correlated) in some way. A trait may be associated with a sample, and the association may be recorded, an action may be triggered, and/or a user may be notified.

BRIEF DESCRIPTION OF THE DRAWINGS

FIG. 1 is a diagrammatic representation showing events as a function of sample number, according to certain aspects.

DETAILED DESCRIPTION OF THE INVENTION

Various aspects provide for receiving a multidimensional data set and processing or analyzing the set to determine traits, trends, or characteristic features associated with the data. Typical data sets may include a plurality of samples, often with associated key/value pairs.

Table 1 is an illustrative example data set, and shows data associated with 11 samples, identified with, a sample identification S(i), or Sid, taking a value from 1 to 11. Each Sid includes a plurality of events. A sample may correspond to a substance that was measured using measurement equipment, and events may correspond to values associated with the measurement. A sample may also correspond to a security, financial instrument, person, clinical result, or any other quantified entity. In some embodiments, "sample" may correspond to anything from or within which a user wishes to identify a trait. A first sample may be a set of second samples.

A trait may be a characteristic of one or more samples, and/or a characteristic of a plurality of samples. A trait may generally be comprised of one or more events. An event may be associated with a sample. Events may include one or many measurements and/or observations. Events may include a temperature, a Raman peak, an FTIR wavenumber, a spectrum, a chromatograph, a peak, a gene, genome, a wavelength, a color, a price, a change in a quantity, a response to an input, a category, a chromosomal feature, DNA, RNA, a link in a network (e.g., a social network), one or more keywords (e.g., in a search), a database query, fracture, a fatigue response, an electrochemical response, a voltage, a sound, a question posed by an entity, a derivative of a function or security, traffic information, and fractions and/or components thereof.

For illustrative simplicity, various aspects are described herein using synthetic x-ray diffraction (XRD) data, simplified to either the existence (or lack thereof) of a peak and a particular value of 2theta. Thus, events in Table 2 may correspond to "peaks," and the value of each event may be a 2theta position associated with each peak. Other measurement data (Raman, FTIR, efficacity, concentration, price, change in price, number of members, change in a number) as well as synthesis data (composition, temperature, crystallization data) may be included. For simplicity, a two dimensional data set is used, although larger dimensionality data sets may also be used.

In some embodiments, a trait may be associated with one or more events. In certain cases, a trait is associated with a plurality of events. A trait may be associated with one or more samples; a trait may also be associated with a plurality of samples, yet not associated with any particular sample.

In some cases, the recording or measurement of an event may be accurate as received (e.g., a permanent IP address, or a stock symbol). In other cases, it may be advantageous to "bin" or categorize or group events for subsequent analysis. For example, an event may correspond to a time, recorded with microsecond accuracy, but it may be advantageous to mark two events differing by less than one millisecond as having occurred at the same time. Many measurement devices include some experimental error, and it may be advantageous to bracket each event by an "error bar" associated with this error. In some embodiments, two or more events whose value differs by less than three, two or even one error bars may be considered the same event.

Data in Table 1 may be binned for analysis, for example as shown in Table 2. Events in Table 2 have been assigned to bins based on their similarity with other events (e.g., a difference between two events being less than an error associated with a measurement of the events), annotated as EventID or E(i). Events may be binned with a finer granularity (e.g., more bins or tighter experimental error), and events may be analyzed without binning. A first event may be a plurality of second events.

TABLE 1

| Sample | Event | | | | | | | | | | | |
|---|---|---|---|---|---|---|---|---|---|---|---|---|
| 1 | 19.2 | 26.2 | 28.1 | 33.1 | 40.0 | 47.2 | 49.0 | 51.7 | 55.2 | 59.3 | 64.1 | 69.4 | 70.9 |
| 2 | 19.1 | 26.1 | 27.9 | 33.0 | 40.0 | 46.9 | 48.8 | 51.4 | 59.0 | 69.0 | | | |
| 3 | 19.0 | 25.8 | 32.7 | 39.7 | 46.4 | 48.4 | 50.9 | 58.5 | 63.2 | 68.6 | | | |
| 4 | 19.0 | 21.9 | 25.7 | 28.7 | 32.5 | 39.5 | 46.2 | 48.2 | 50.8 | 58.1 | | | |
| 5 | 21.9 | 28.4 | 30.4 | 35.0 | 42.0 | 47.1 | 50.2 | | | | | | |
| 6 | 21.9 | 28.4 | 30.4 | 34.9 | 41.9 | 47.0 | 50.3 | | | | | | |
| 7 | 21.9 | 24.6 | 28.2 | 30.2 | 34.6 | 41.7 | 43.8 | 47.0 | 49.7 | | | | |
| 8 | 21.9 | 24.6 | 28.2 | 30.3 | 34.4 | 41.7 | 43.7 | 46.4 | 50.0 | | | | |
| 9 | 21.8 | 24.6 | 28.2 | 30.1 | 34.4 | 36.2 | 41.7 | 43.8 | 46.4 | 50.6 | | | |
| 10 | 19.5 | 24.6 | 29.5 | 34.3 | 36.2 | 43.7 | 46.1 | 47.9 | 50.5 | 63.5 | | | |
| 11 | 19.5 | 24.5 | 29.4 | 34.2 | 36.0 | 40.6 | 43.5 | 46.1 | 47.7 | 50.2 | 63.2 | | |

A frequency of occurrence of an event across the data set may be calculated. For some data sets, assigning events to a bin may simplify the determination that two slightly different events may be treated as if they were the same event. An exemplary frequency of occurrence may correspond to a number of members in a given bin (e.g., the number of samples having an event associated with that bin). A value E(i,i) may be a self-correlation value, describing the number of times that Event (i) occurs with itself.

The co-occurrence of two or more events may be calculated (herein E(i,j)). For illustrative simplicity, co-occurrence and/or correlation is described herein using pairwise correlations, although higher order or more complex correlation functions may be implemented. For some data sets, pairwise correlation may yield sufficient results and speed calculations. For some data sets, multi-event co-correlations may provide increased accuracy and/or discrimination in trait determination.

matrix showing exemplary values for correlation between pairs of events (in this case, the addition of the number of samples for which both events occurred). More complex co-occurrence calculations are possible, including a probability associated with an event. Co-occurence may also include additional information associated with an event (e.g., a peak intensity in addition to the existence of the peak).

Table 3 may also provide a graphical illustration for convenience, although various embodiments include automated analyses of these data. The body diagonal in Table 3, showing values of E(i,i), may provide information describing the frequency of an event within a data set (e.g., within the set of samples). For example, E(15, 15)=11, showing that event (15) was present in each sample. E(1,1)=6, showing the presence of Event (1) in 6/11 samples, and E(12,12)=1, showing that Event (12) occurred in only one sample.

Various embodiments provide for the assignment of events to one or more traits, and generally may provide for the

TABLE 2

| Sample ID | 1 | 1 | 1 | 1 | 1 | 1 | 1 | 1 | 1 | 1 | 1 | 1 | 1 |
|---|---|---|---|---|---|---|---|---|---|---|---|---|---|
| Event | 19.2 | 26.2 | 28.1 | 33.1 | 40.0 | 47.2 | 49.0 | 51.7 | 55.2 | 59.3 | 64.1 | 69.4 | 70.9 |
| Event ID | 1 | 4 | 5 | 8 | 11 | 15 | 16 | 18 | 19 | 21 | 23 | 24 | 25 |
| Sample ID | 2 | 2 | 2 | 2 | 2 | 2 | 2 | 2 | 2 | 2 | | | |
| Event | 19.1 | 26.1 | 27.9 | 33.0 | 40.0 | 46.9 | 48.8 | 51.4 | 59.0 | 69.0 | | | |
| Event ID | 1 | 4 | 5 | 8 | 11 | 15 | 16 | 18 | 21 | 24 | | | |
| Sample ID | 3 | 3 | 3 | 3 | 3 | 3 | 3 | 3 | 3 | 3 | | | |
| Event | 19.0 | 25.8 | 32.7 | 39.7 | 46.4 | 48.4 | 50.9 | 58.5 | 63.2 | 68.6 | | | |
| Event ID | 1 | 4 | 8 | 11 | 15 | 16 | 17 | 20 | 22 | 24 | | | |
| Sample ID | 4 | 4 | 4 | 4 | 4 | 4 | 4 | 4 | 4 | 4 | | | |
| Event | 19.0 | 21.9 | 25.7 | 28.7 | 32.5 | 39.5 | 46.2 | 48.2 | 50.8 | 58.1 | | | |
| Event ID | 1 | 2 | 4 | 5 | 8 | 11 | 15 | 16 | 17 | 20 | | | |
| Sample ID | 5 | 5 | 5 | 5 | 5 | 5 | 5 | | | | | | |
| Event | 21.9 | 28.4 | 30.4 | 35.0 | 42.0 | 47.1 | 50.2 | | | | | | |
| Event ID | 2 | 5 | 7 | 9 | 13 | 15 | 17 | | | | | | |
| Sample ID | 6 | 6 | 6 | 6 | 6 | 6 | 6 | | | | | | |
| Event | 21.9 | 28.4 | 30.4 | 34.9 | 41.9 | 47.0 | 50.3 | | | | | | |
| Event ID | 2 | 5 | 7 | 9 | 13 | 15 | 17 | | | | | | |
| Sample ID | 7 | 7 | 7 | 7 | 7 | 7 | 7 | 7 | 7 | | | | |
| Event | 21.9 | 24.6 | 28.2 | 30.2 | 34.6 | 41.7 | 43.8 | 47.0 | 49.7 | | | | |
| Event ID | 2 | 3 | 5 | 7 | 9 | 13 | 14 | 15 | 17 | | | | |
| Sample ID | 8 | 8 | 8 | 8 | 8 | 8 | 8 | 8 | 8 | | | | |
| Event | 21.9 | 24.6 | 28.2 | 30.3 | 34.4 | 41.7 | 43.7 | 46.4 | 50.0 | | | | |
| Event ID | 2 | 3 | 5 | 7 | 9 | 13 | 14 | 15 | 17 | | | | |
| Sample ID | 9 | 9 | 9 | 9 | 9 | 9 | 9 | 9 | 9 | 9 | | | |
| Event | 21.8 | 24.6 | 28.2 | 30.1 | 34.4 | 36.2 | 41.7 | 43.8 | 46.4 | 50.6 | | | |
| Event ID | 2 | 3 | 5 | 7 | 9 | 10 | 13 | 14 | 15 | 17 | | | |
| Sample ID | 10 | 10 | 10 | 10 | 10 | 10 | 10 | 10 | 10 | 10 | | | |
| Event | 19.5 | 24.6 | 29.5 | 34.3 | 36.2 | 43.7 | 46.1 | 47.9 | 50.5 | 63.5 | | | |
| Event ID | 1 | 3 | 6 | 9 | 10 | 14 | 15 | 16 | 17 | 22 | | | |
| Sample ID | 11 | 11 | 11 | 11 | 11 | 11 | 11 | 11 | 11 | 11 | 11 | | |
| Event | 19.5 | 24.5 | 29.4 | 34.2 | 36.0 | 40.6 | 43.5 | 46.1 | 47.7 | 50.2 | 63.2 | | |
| Event ID | 1 | 3 | 6 | 9 | 10 | 12 | 14 | 15 | 16 | 17 | 22 | | |

A value for co-occurrence E(i,j) may be a number of times (e.g., in a number of samples or in the set of data) that Event (i) and Event (j) occur together. Table 3 shows a symmetrical determination of one or more traits associated with each sample. In some aspects, a trait may be extracted by processes somewhat like nucleation and growth, in which (for example)

a pair of events forms a nucleus of a possible trait, and events are associated with the trait based on their association with events already present in the trait. In other aspects, traits may be formed with methods somewhat akin to spinodal decomposition, in which the correlation among a random combination of events is evaluated until a set of events having a small degree of correlation is determined. The set of somewhat correlated events may continually add and remove members, gradually iterating toward a final trait composition. Iteration may include adding a member when a figure of merit (e.g., a total trait self-correlation function) is improved. Iteration may also include deleting a member when deletion similarly improves this figure of merit.

Depending upon a type of trait and/or types of samples, trait analysis may incorporate the number of times that an event occurs in the sample set. In some cases, trait identification may be improved when events associated with a trait occur more frequently. In certain embodiments, an event frequency for each Event (i), (between 0 and 1) is calculated by dividing E(i) by the number of samples. In some embodiments, a trait identification process may focus in a first routine on events whose frequency is greater than an event frequency threshold, and in a second routine on events whose frequency is lower than a threshold. Exemplary thresholds include 0.01, 0.1, 0.5, 0.7, 0.9, and 1.

A trait may include multiple events, and co-occurrence of events may be determined. Table 3 illustrates that some events always occur together, some events sometimes occur together, and some events do not occur together. For example, $E(2,7)=E(7,7)=5$, showing that event 7 occurs whenever event 2 occurs, although event 2 occurs once without event 7. Co-occurrence $E(1,13)=0$, showing that events 1 and 13 do not occur together, notwithstanding that both of these events occur separately several times ($E(1,1)=6; E(13,13)=5$). Similarly, $E(2,14)=3$, showing that event 2 occurs with event 14 in 3/6 samples, and event 14 occurs with event 2 in 3/5 samples.

In some embodiments, a first event that sometimes occurs with a second event may be annotated as a multitrait event, or an event that may be included in two or more traits (e.g., event 15) or in a sample having two or more traits.

In some embodiments, assigning events to one or more traits may begin with selecting an event (i) that has both strong co-occurrence with first other events (j) (e.g, $E(i,j)=1$)) and strong anti-occurrence with second other events (k) (e.g., $E(i,k)=0$). An exemplary selection may include selecting one or more events (i) for which the standard deviation of the co-occurrence of the event (i) with a plurality of (e.g., all) other events (j) is a maximum. In certain cases, normalizing this standard deviation to the number of times that E(i) occurs may improve comparison among different events. Exemplary events (i) having large values for (e.g.,) the standard deviation of (E(i,j) over all j)/E(i) are events 6, 7, 12, 13, 18-21, 23 and 25. In some cases, a first trait may be nucleated with two or more events having strong correlation, and a second trait may be nucleated with an event having a strong anti-correlation with one or more events in the first trait. For example, $E(6,7)=E(6,13)=0$, suggesting that events 6 and 7 would be associated with different traits, and events 6 and 13 would be associated be in different traits. Thus, a first trait may include event 6 and a second trait may include event 7 and/or event 13. Comparing events 7 and 13: $E(7,13)=E(7,7)=E(13,13)=5$, suggesting that events 7 and 13 are strongly correlated, and thus the second trait may include events 7 and 13.

In some embodiments, multitrait events are identified. These events may be associated with several traits and/or samples with several traits. In some cases, events (i) having small values for the standard deviation of (E(i,j) over all j)/E(i)) may be associated with multitrait events. Exemplary events include events 1, 5, 15, 16, and 17. In certain cases, a particularly low value (e.g., event 15) may be associated with an event that corresponds to a background, a substrate, a standard, a control, and/or another feature associated with many (or even all) samples.

TABLE 3

| E(i,j) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | stdev | sd/ii |
|---|---|---|---|---|---|---|---|---|---|---|---|---|---|---|---|---|---|---|---|---|---|---|---|---|---|---|---|
| 1 | 6 | 1 | 2 | 4 | 3 | 2 | 0 | 4 | 2 | 2 | 4 | 1 | 0 | 2 | 6 | 6 | 4 | 2 | 1 | 2 | 2 | 3 | 1 | 3 | 1 | 1.7 | 0.3 |
| 2 | 1 | 6 | 3 | 1 | 6 | 0 | 5 | 1 | 5 | 1 | 1 | 0 | 5 | 3 | 6 | 1 | 6 | 0 | 0 | 1 | 0 | 0 | 0 | 0 | 0 | 2.4 | 0.4 |
| 3 | 2 | 3 | 5 | 0 | 3 | 2 | 3 | 0 | 5 | 3 | 0 | 1 | 3 | 5 | 5 | 2 | 5 | 0 | 0 | 0 | 0 | 2 | 0 | 0 | 0 | 1.9 | 0.4 |
| 4 | 4 | 1 | 0 | 4 | 3 | 0 | 0 | 4 | 0 | 0 | 4 | 0 | 0 | 0 | 4 | 4 | 2 | 2 | 1 | 2 | 2 | 1 | 1 | 3 | 1 | 1.6 | 0.4 |
| 5 | 3 | 6 | 3 | 3 | 8 | 0 | 5 | 3 | 5 | 1 | 3 | 0 | 5 | 3 | 8 | 3 | 6 | 2 | 1 | 1 | 2 | 0 | 1 | 2 | 1 | 2.3 | 0.3 |
| 6 | 2 | 0 | 2 | 0 | 0 | 2 | 0 | 0 | 2 | 2 | 0 | 1 | 0 | 2 | 2 | 2 | 2 | 0 | 0 | 0 | 0 | 2 | 0 | 0 | 0 | 1.0 | 0.5 |
| 7 | 0 | 5 | 3 | 0 | 5 | 0 | 5 | 0 | 5 | 1 | 0 | 0 | 5 | 3 | 5 | 0 | 5 | 0 | 0 | 0 | 0 | 0 | 0 | 0 | 0 | 2.3 | 0.5 |
| 8 | 4 | 1 | 0 | 4 | 3 | 0 | 0 | 4 | 0 | 0 | 4 | 0 | 0 | 0 | 4 | 4 | 2 | 2 | 1 | 2 | 2 | 1 | 1 | 3 | 1 | 1.6 | 0.4 |
| 9 | 2 | 5 | 5 | 0 | 5 | 2 | 5 | 0 | 7 | 3 | 0 | 1 | 5 | 5 | 7 | 2 | 7 | 0 | 0 | 0 | 0 | 2 | 0 | 0 | 0 | 2.6 | 0.4 |
| 10 | 2 | 1 | 3 | 0 | 1 | 2 | 1 | 0 | 3 | 3 | 0 | 1 | 1 | 3 | 3 | 2 | 3 | 0 | 0 | 0 | 0 | 2 | 0 | 0 | 0 | 1.2 | 0.4 |
| 11 | 4 | 1 | 0 | 4 | 3 | 0 | 0 | 4 | 0 | 0 | 4 | 0 | 0 | 0 | 4 | 4 | 2 | 2 | 1 | 2 | 2 | 1 | 1 | 3 | 1 | 1.6 | 0.4 |
| 12 | 1 | 0 | 1 | 0 | 0 | 1 | 0 | 0 | 1 | 1 | 0 | 1 | 0 | 1 | 1 | 1 | 1 | 0 | 0 | 0 | 0 | 1 | 0 | 0 | 0 | 0.5 | 0.5 |
| 13 | 0 | 5 | 3 | 0 | 5 | 0 | 5 | 0 | 5 | 1 | 0 | 0 | 5 | 3 | 5 | 0 | 5 | 0 | 0 | 0 | 0 | 0 | 0 | 0 | 0 | 2.3 | 0.5 |
| 14 | 2 | 3 | 5 | 0 | 3 | 2 | 3 | 0 | 5 | 3 | 0 | 1 | 3 | 5 | 5 | 2 | 5 | 0 | 0 | 0 | 0 | 2 | 0 | 0 | 0 | 1.9 | 0.4 |
| 15 | 6 | 6 | 5 | 4 | 8 | 2 | 5 | 4 | 7 | 3 | 4 | 1 | 5 | 5 | 11 | 6 | 9 | 2 | 1 | 2 | 2 | 3 | 1 | 3 | 1 | 2.7 | 0.2 |
| 16 | 6 | 1 | 2 | 4 | 3 | 2 | 0 | 4 | 2 | 2 | 4 | 1 | 0 | 2 | 6 | 6 | 4 | 2 | 1 | 2 | 2 | 3 | 1 | 3 | 1 | 1.7 | 0.3 |
| 17 | 4 | 6 | 5 | 2 | 6 | 2 | 5 | 2 | 7 | 3 | 2 | 1 | 5 | 5 | 9 | 4 | 9 | 0 | 0 | 2 | 0 | 3 | 0 | 1 | 0 | 2.7 | 0.3 |
| 18 | 2 | 0 | 0 | 2 | 2 | 0 | 0 | 2 | 0 | 0 | 2 | 0 | 0 | 0 | 2 | 2 | 0 | 2 | 1 | 0 | 2 | 0 | 1 | 2 | 1 | 1.0 | 0.5 |
| 19 | 1 | 0 | 0 | 1 | 1 | 0 | 0 | 1 | 0 | 0 | 1 | 0 | 0 | 0 | 1 | 1 | 0 | 1 | 1 | 0 | 1 | 1 | 1 | 1 | 1 | 0.5 | 0.5 |
| 20 | 2 | 1 | 0 | 2 | 1 | 0 | 0 | 2 | 0 | 0 | 2 | 0 | 0 | 0 | 2 | 2 | 2 | 0 | 0 | 2 | 0 | 1 | 0 | 1 | 0 | 0.9 | 0.5 |
| 21 | 2 | 0 | 0 | 2 | 2 | 0 | 0 | 2 | 0 | 0 | 2 | 0 | 0 | 0 | 2 | 2 | 0 | 2 | 1 | 0 | 2 | 0 | 1 | 2 | 1 | 1.0 | 0.5 |
| 22 | 3 | 0 | 2 | 1 | 0 | 2 | 0 | 1 | 2 | 2 | 1 | 1 | 0 | 2 | 3 | 3 | 3 | 0 | 0 | 1 | 0 | 3 | 0 | 1 | 0 | 1.2 | 0.4 |
| 23 | 1 | 0 | 0 | 1 | 1 | 0 | 0 | 1 | 0 | 0 | 1 | 0 | 0 | 0 | 1 | 1 | 0 | 1 | 1 | 0 | 1 | 0 | 1 | 1 | 1 | 0.5 | 0.5 |
| 24 | 3 | 0 | 0 | 3 | 2 | 0 | 0 | 3 | 0 | 0 | 3 | 0 | 0 | 0 | 3 | 3 | 1 | 2 | 1 | 1 | 2 | 1 | 1 | 3 | 1 | 1.2 | 0.4 |
| 25 | 1 | 0 | 0 | 1 | 1 | 0 | 0 | 1 | 0 | 0 | 1 | 0 | 0 | 0 | 1 | 1 | 0 | 1 | 1 | 0 | 1 | 0 | 1 | 1 | 1 | 0.5 | 0.5 |

In some aspects, a trait may be nucleated with one or more events (i) having a boolean correlation response with other events (j) (e.g., $E(i,j)$ is either 0 or 1 for all j). In some embodiments, a trait may be nucleated by selecting an event that appears a small number of times (where small may largely be determined by the size of the data set). For example, a distribution of values of $E(i,i)$ may be calculated, and events (j) for which $E(j,j)$ is in the bottom 1%, 5%, 10% or 30% of the distribution may be selected. Certain selections appear once. Exemplary selections using the present example data may be events for which $E(i,i)=1$, such as events 12, 19, 23, and 25. In certain embodiments, a trait may be nucleated with a first event that appears rarely, and combining the first event with a second event that always occurs with the first event to form a nucleus of two events. In some cases, the second event also appears rarely.

In some aspects, it may be advantageous to normalize co-occurrence of events (e.g., the co-occurrence matrix). For a pairwise correlation example, $E(i,j)$ may be normalized to $E(i)$ and/or $E(j)$, depending upon a trait being analyzed. Table 4 shows an asymmetrical co-occurrence matrix in which the upper right quadrant shows values of $E'(i,j)$ that have been normalized to the lower of $E(i,i)$ and $E(j,j)$. Events may also be normalized to the higher of $E(i,i)$ or $E(j,j)$, and in some cases, a trait nucleus may be created from events for which $E(i,i)=E(i,j)=E(j,j)$ for two or more events in the nucleus.

Data in the upper right quadrant have been rounded to one decimal place for convenience. In some embodiments, it may be advantageous to round these data to either 0 or 1, and in some such cases, subsequent processing may be performed with integers, which may speed certain calculations.

In some cases, it may be advantageous to create a set of trait nuclei, wherein each nucleus includes one or more events, and an event never occurs with an event in another nucleus (i.e., $E'(i,j)=0$ for i and j in different nuclei). For example, events 6, 7, and 8 never occur together, and thus each could become a nucleus (termed N6, N7, and N8) for a different trait. Similarly, events 13, 22, 23 could each nucleate a different trait, forming nuclei (termed N13, N22, and N23).

Nuclei may be combined. A first set of trait nuclei (N6, N7, N8) may be compared with a second set of trait nuclei (N13, N22, N23) to examine their correlation, and nuclei may be merged and/or maintained as discrete traits. Such an analysis in this case may yield a first nucleus with events 6 and 22 (because $E(6,22)=1$ and $E(6,13)=E(6,23)=0$; a second nucleus with events 7 and 13 ($E(7,13)=1$, $E(7,22)=E(7,23)=0$), and a third nucleus with events 8 and 23 ($E(8,23)=1$, $E(8,22)=0.3$, $E(8,13)=0$).

As shown in Table 4, several normalized $E'(i,j)$ values are equal to one, showing that for this normalization, certain events occur as often with another event as they themselves occur. For example, $E(1,4)=E(4,4)=4$, showing that when Event(4) occurs, Event(1) also occurs, so $E'(1,4)=1$. However, the converse is not true in this case, (which may be represented by a normalization matrix wherein the denominator is the larger of $E(i,i)$ and $E(j,j)$), and Event (1) occurs twice in samples that do not display Event (4).

Various embodiments may be illustrated by focusing on normalized values of $E'(i,j)=1$, as highlighted in Table 4. In certain embodiments, two or more events are grouped together into a trait based on their co-occurrence.

In some embodiments, a trait may be constructed (e.g., a nucleus may be created) from two or more co-occurring events, and in some cases, a trait includes a set of events in which events within the set have a co-occurrence greater than a threshold (e.g., $E'(i,j)>0.4, 0.6, 0.8, 0.9$). A nucleus may be comprised of events for which $E'(i,j)=1$. In some cases, each pair of events in a trait has a co-occurrence greater than a threshold. In other cases, a correlation across multiple (e.g., two or more) events in a nucleus may be greater than a threshold.

Growth (e.g., a more thorough description) of a trait may include the addition of an event to a set of events associated with the trait (e.g., a nucleus). In some cases, an event may be added to more than one nucleus. In other cases, an event is added to a first nucleus and is annotated so that it is not added to a second nucleus.

TABLE 4

E'(i,j); upper right quadrant normalized, body diagonal and lower left not normalized.

| E(i,j)/MIN(E(i,i),E(j,j)) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 1 | 6 | 0.2 | 0.4 | 1.0 | 0.5 | 1.0 | 0.0 | 1.0 | 0.3 | 0.7 | 1.0 | 1.0 | 0.0 | 0.4 | 1.0 | 1.0 | 0.7 | 1.0 | 1.0 | 1.0 | 1.0 | 1.0 | 1.0 | 1.0 | 1.0 |
| 2 | 1 | 6 | 0.6 | 0.3 | 1.0 | 0.0 | 1.0 | 0.3 | 0.8 | 0.3 | 0.3 | 0.0 | 1.0 | 0.6 | 1.0 | 0.2 | 1.0 | 0.0 | 0.0 | 0.5 | 0.0 | 0.0 | 0.0 | 0.0 | 0.0 |
| 3 | 2 | 3 | 5 | 0.0 | 0.6 | 1.0 | 0.6 | 0.0 | 1.0 | 1.0 | 0.0 | 1.0 | 0.6 | 1.0 | 1.0 | 0.4 | 1.0 | 0.0 | 0.0 | 0.0 | 0.0 | 0.7 | 0.0 | 0.0 | 0.0 |
| 4 | 4 | 1 | 0 | 4 | 0.8 | 0.0 | 0.0 | 1.0 | 0.0 | 0.0 | 1.0 | 0.0 | 0.0 | 0.0 | 1.0 | 1.0 | 0.5 | 1.0 | 1.0 | 1.0 | 1.0 | 0.3 | 1.0 | 1.0 | 1.0 |
| 5 | 3 | 6 | 3 | 3 | 8 | 0.0 | 1.0 | 0.8 | 0.7 | 0.3 | 0.8 | 0.0 | 1.0 | 0.6 | 1.0 | 0.5 | 0.8 | 1.0 | 1.0 | 0.5 | 1.0 | 0.0 | 1.0 | 0.7 | 1.0 |
| 6 | 2 | 0 | 2 | 0 | 0 | 2 | 0.0 | 0.0 | 1.0 | 1.0 | 0.0 | 0.0 | 1.0 | 1.0 | 1.0 | 1.0 | 0.0 | 0.0 | 0.0 | 0.0 | 1.0 | 0.0 | 0.0 | 0.0 |
| 7 | 0 | 5 | 3 | 0 | 5 | 0 | 5 | 0.0 | 1.0 | 0.3 | 0.0 | 0.0 | 1.0 | 0.6 | 1.0 | 0.0 | 1.0 | 0.0 | 0.0 | 0.0 | 0.0 | 0.0 | 0.0 | 0.0 | 0.0 |
| 8 | 4 | 1 | 0 | 4 | 3 | 0 | 0 | 4 | 0.0 | 0.0 | 1.0 | 0.0 | 0.0 | 0.0 | 1.0 | 1.0 | 0.5 | 1.0 | 1.0 | 1.0 | 1.0 | 0.3 | 1.0 | 1.0 | 1.0 |
| 9 | 2 | 5 | 5 | 0 | 5 | 2 | 5 | 0 | 7 | 1.0 | 0.0 | 1.0 | 1.0 | 1.0 | 1.0 | 0.3 | 1.0 | 0.0 | 0.0 | 0.0 | 0.0 | 0.7 | 0.0 | 0.0 | 0.0 |
| 10 | 2 | 1 | 3 | 0 | 1 | 2 | 1 | 0 | 3 | 3 | 0.0 | 1.0 | 0.3 | 1.0 | 1.0 | 0.7 | 1.0 | 0.0 | 0.0 | 0.0 | 0.0 | 0.7 | 0.0 | 0.0 | 0.0 |
| 11 | 4 | 1 | 0 | 4 | 3 | 0 | 0 | 4 | 0 | 0 | 4 | 0.0 | 0.0 | 0.0 | 1.0 | 1.0 | 0.5 | 1.0 | 1.0 | 1.0 | 1.0 | 0.3 | 1.0 | 1.0 | 1.0 |
| 12 | 1 | 0 | 1 | 0 | 0 | 1 | 0 | 0 | 1 | 1 | 0 | 1 | 0.0 | 1.0 | 1.0 | 1.0 | 1.0 | 0.0 | 0.0 | 0.0 | 0.0 | 1.0 | 0.0 | 0.0 | 0.0 |

TABLE 4-continued

E'(i,j); upper right quadrant normalized, body diagonal and lower left not normalized.

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 13 | 0 | 5 | 3 | 0 | 5 | 0 | 5 | 0 | 5 | 1 | 0 | 0 | 5 | 0.6 | 1.0 | 0.0 | 1.0 | 0.0 | 0.0 | 0.0 | 0.0 | 0.0 | 0.0 | 0.0 | 0.0 |
| 14 | 2 | 3 | 5 | 0 | 3 | 2 | 3 | 0 | 5 | 3 | 0 | 1 | 3 | 5 | 1.0 | 0.4 | 1.0 | 0.0 | 0.0 | 0.0 | 0.0 | 0.7 | 0.0 | 0.0 | 0.0 |
| 15 | 6 | 6 | 5 | 4 | 8 | 2 | 5 | 4 | 7 | 3 | 4 | 1 | 5 | 5 | 11 | 1.0 | 1.0 | 1.0 | 1.0 | 1.0 | 1.0 | 1.0 | 1.0 | 1.0 | 1.0 |
| 16 | 6 | 1 | 2 | 4 | 3 | 2 | 0 | 4 | 2 | 2 | 4 | 1 | 0 | 2 | 6 | 6 | 0.7 | 1.0 | 1.0 | 1.0 | 1.0 | 1.0 | 1.0 | 1.0 | 1.0 |
| 17 | 4 | 6 | 5 | 2 | 6 | 2 | 5 | 2 | 7 | 3 | 2 | 1 | 5 | 5 | 9 | 4 | 9 | 0.0 | 0.0 | 1.0 | 0.0 | 1.0 | 0.0 | 0.3 | 0.0 |
| 18 | 2 | 0 | 0 | 2 | 2 | 0 | 0 | 2 | 0 | 0 | 2 | 0 | 0 | 0 | 2 | 2 | 0 | 2 | 1.0 | 0.0 | 1.0 | 0.0 | 1.0 | 1.0 | 1.0 |
| 19 | 1 | 0 | 0 | 1 | 1 | 0 | 0 | 1 | 0 | 0 | 1 | 0 | 0 | 0 | 1 | 1 | 0 | 1 | 1 | 0.0 | 1.0 | 0.0 | 1.0 | 1.0 | 1.0 |
| 20 | 2 | 1 | 0 | 2 | 1 | 0 | 0 | 2 | 0 | 0 | 2 | 0 | 0 | 0 | 2 | 2 | 2 | 0 | 0 | 2 | 0.0 | 0.5 | 0.0 | 0.0 | 0.0 |
| 21 | 2 | 0 | 0 | 2 | 2 | 0 | 0 | 2 | 0 | 0 | 2 | 0 | 0 | 0 | 2 | 2 | 0 | 2 | 1 | 0 | 2 | 0.0 | 1.0 | 1.0 | 1.0 |
| 22 | 3 | 0 | 2 | 1 | 0 | 2 | 0 | 1 | 2 | 2 | 1 | 1 | 0 | 2 | 3 | 3 | 3 | 0 | 0 | 1 | 0 | 3 | 0.0 | 0.3 | 0.0 |
| 23 | 1 | 0 | 0 | 1 | 1 | 0 | 0 | 1 | 0 | 0 | 1 | 0 | 0 | 0 | 1 | 1 | 0 | 1 | 1 | 0 | 1 | 0 | 1 | 1.0 | 1.0 |
| 24 | 3 | 0 | 0 | 3 | 2 | 0 | 0 | 3 | 0 | 0 | 3 | 0 | 0 | 0 | 3 | 3 | 1 | 2 | 1 | 1 | 2 | 1 | 1 | 3 | 1.0 |
| 25 | 1 | 0 | 0 | 1 | 1 | 0 | 0 | 1 | 0 | 0 | 1 | 0 | 0 | 0 | 1 | 1 | 0 | 1 | 1 | 0 | 1 | 0 | 1 | 1 | 1 |

A set of "possible additions" to a nucleus or set of events associated with a trait may contain one or more events E(k) for which E(i,k) is greater than the threshold. Co-occurrence of each event E(k) with the other members (j) of the trait, may then be examined. A "possible addition" may be added to the trait when E(j,k) is also greater than the threshold, and the set (or trait), may expand to include members E(i), E(j), and E(k), for which the co-occurrences of these events are all greater than the threshold.

For example, consider three previously identified trait nuclei (herein traits). Trait-6-22 includes events 6 and 22. Trait-7-13 includes events 7 and 13. Trait-8-23 includes events 8 and 23. Various methods to determine a set boundary may be used to assign other events in the data set to one or more traits. In some embodiments, a list of possible additions to a trait may include events (outside the trait) that have a strong correlation (e.g., E(i,j) greater than 0.6, 0.8, 0.9, or equal to 1) with one or more events in the trait. A possible addition may be selected from this list, and a correlation between the selected possible addition and other members of the trait may then be examined, and the selected possible addition may be added when the correlation is above a threshold. Using Trait-6-22 as an example, a set of possible additions to the trait may include a set of events (j) for which E'(6,j) and/or E'(22,j) are greater than or equal to a threshold (which may be chosen to be one). For example, events j=9, 10, 12, 14, 15, 16, and 17 have E'(6, j)=1. Of these, events j=12, 15, 16, and 17 have E'(22,j)=1, and E'(10,22)=E'(14, 22)=0.7. Thus events 9, 10, 12, 14, 15, 16, and 17 may be added to the trait using a threshold of 0.7, and events 12 and 17 may be added using at threshold of 1. When a new event k is added to a trait comprising events (i), a new set of possible additions l (e.g., for which E(k,l)=1) may then be compared (e.g., examine E(i,l) to determine whether a particular event (l) is then added to the trait. Such an expansion of trait-6-22 may result in member events 3-6-9-10-12-14-15-17-22

Events having different levels of correlation with one or more existing members of the set may be used in assigning an importance or strength of each event with respect to a trait. For example, "core" events may be events that only occur with other members of the trait (e.g., events i for which normalized E'(i,j)=1 for all j in the trait), such as events 6 and 12. Some core events do not have a correlation with events outside the trait. Some events may be associated with many (or even all) traits (e.g., event 15), and in some cases, such events may not provide discriminatory information and so may be omitted from further analysis. "Associated" events (i) may be events that may occur in other traits or events that may occur in a sample having multiple traits. In some embodiments, the existence of an associated event within a sample may signify the presence of more than one trait. In some cases, association may be manifest as E(i,j)<1 for one or more j within the trait. Some events may have a strong effect on a traitwide correlation coefficient and may be annotated as "key" events. For example, trait 6-22 may include key event 22 with a threshold of 0.7. However, the correlation of event 22 with events 3, 10 and 14=0.7. Removal of event 22 may then result in a set of events having E'(i,j)=1 for the event. Thus, trait-6-22 may include core events 3, 6, 9, 10, 12, 14, 15, and 17, and associated or key event 22, based on E(3,22)=0.7, E(9,22)=0.7, E(10, 22)=0.7, and E(14, 22)=0.7.

Trait-7-13 may be grown to include events, 2, 5, 7, 9, 13, 15, and 17, of which events 2, 7, 13, 15, and 17 may be "core" events, events 5 and 9 may be associated events. In some embodiments, events such as event 5 may be a key event, which may be an event whose inclusion/exclusion in a trait has a particularly large effect on the correlation among one or more traits.

Trait-8-23 may be grown to include core events 1, 4, 8, 11, 15, 16, 18, 19, 21, 23, 24, and 25.

Various embodiments may assign an event to one or more traits (or to no trait). In some cases, assignment may include a strength of association with a trait.

One or more traits may be assigned to a sample. Events in a sample may be evaluated to determine whether they are associated with one or more traits. In some cases, each event in a sample is assigned one or more traits (or assigned to no trait). The strength of a trait's representation within a sample may be determined (e.g., by determining how many events associated with the trait are present in the sample. A sample displaying only one trait may be annotated. A sample displaying multiple traits may be annotated. In some cases, samples may be annotated for further analysis, which may include an iterative re-examination of one or more samples associated with a trait.

FIG. 1 is a diagrammatic representation showing events as a function of sample number, according to certain aspects. For illustrative purposes, trait(s) associated with each event annotated. Event 15, occurring within each sample, is not annotated.

Samples may be highlighted and/or annotated for further analysis by evaluating a representation of a sample's response by one or more traits (e.g., fitting traits to a sample). Absence of a trait associated with an event may be a marker. For example, samples 3 and 4 include event 20, which is unassigned to a trait. Cluster analysis of the E(20, i) within the trait shows that event 20 co-occurs with events 1, 4, 8, 11, 15, 16, and 18, but not with events 21, 23, 24, and 25. Thus, event 20 may be a marker for finer granularity within event 8-23. A sample for which no events are assigned to more than one trait may be marked as a single-trait sample (e.g., sample 1). A sample having events assigned to more than one trait may be marked as multi-trait samples (e.g., sample 8. A sample having many (or even all) of the core events associated with a trait may be marked as having a core of the trait.

Sample analysis may include determining how many events associated with a given trait are present in a sample (having at least one event of that trait). In some cases, samples may be marked for re-analysis (e.g., iteration) when a trait present in the sample has only a small fraction (e.g., 20%, 10%, or even one of) the events of a given trait. For example, events 1 and 16 are associated with trait 8-23 and trait 6-22. Samples 1-3 show several events associated with trait 8-23. However, events 1 and 16 are the only representatives of trait 8-23 in samples 10 and 11. Cluster analysis of event 1 may show that a single bin capturing all instances of event 1 may be inaccurate, and samples 10 and 11 have values (19.5, 19.5) different than those of samples 1, 2, 3, 4 (19.2, 19.1, 19.0, 19.0, resp.). In some aspects, sample analysis may include re-binning and subsequent re-analysis. In certain embodiments, binning includes calculating an average value for events assigned to a bin, calculating a maximum error associated with an allowed deviation from the average value, and assigning an event to a bin when the event falls within the allowed deviation from the average.

Various steps (including binning, nucleation and growth) may be performed iteratively. For example, after sample analysis identifies event 1 as previously described, a re-binning analyis (e.g., cluster analysis, averaging/exclusion and the like). Re-binning may separate event 1 into event 1' (associated with samples 10, 11) and sample 1" (associated with samples 1-4), and subsequent nucleation/growth may then result in assignment of event 1' to trait 6-22, and assignment of sample 1" to trait 8-23. Following such a procedure, the following traits may be associated with sample as shown in Table 5.

TABLE 5

| Sample | Trait |
|---|---|
| 1 | 8-23, largest number of 8-23 events, event 5 (key event, 7-13 trait) |
| 2 | 8-23, event 5 (key event, 7-13 trait) |
| 3 | 8-23, one 7-13 event, one 6-22 event, event 20 |
| 4 | 8-23, three 7-13 events, event 5 (key event, 7-13 trait), event 20 |
| 5 | 7-13, two 6-22 events (one also not 7-13), event 5 (key event, 7-13 trait) |
| 6 | 7-13, two 6-22 events (one also not 7-13), event 5 (key event, 7-13 trait) |
| 7 | 7-13, 6-22 (several events eachevent 5 (key event, 7-13 trait) |
| 8 | 7-13, 6-22 (several events each), event 5 (key event, 7-13 trait) |
| 9 | 7-13, 6-22 (several events each), event 5 (key event, 7-13 trait) |
| 10 | 6-22, one 7-13 (also 6-22) |
| 11 | 6-22, one 7-13 (also 6-22), largest # of 6-22 events |

In some embodiments, a trait may be matched to a known or canonical trait (e.g., a known diffraction pattern). In some cases, the correlation of an associated event with a trait may be increased or decreased based on the event's presence in the canonical trait.

For some data sets, a "pre-binning" step may be performed. In such cases, a coarse grouping or clustering of samples sharing at least some feature may speed processing. For example, a library of crystallization experiments associated with an API may be analyzed as a library, as opposed to analyzed simultaneously with libraries associated with other API's. In other cases, many API's may be analyzed simultaneously. For spectral data, a minimum overlap of spectra may be used for pre-binning.

Various embodiments provide for storing, notifying a user, triggering a process (e.g., a followup procedure), presenting an advertisement, and/or other action upon the identification of a trait, identification of a sample having a trait, and/or identification of a trait (or absence of a trait) within a sample. In some cases, a number of samples displaying a trait may trigger an event (e.g., a single sample displaying a trait, or a certain critical number of samples displaying a trait). In some embodiments, a time associated with each sample may be recorded, and in some cases, a sample displaying a 'new' trait may be annotated (and optionally an action triggered).

Various embodiments provide for a computing device including a processor, memory, storage, input, output, display, networking hardware, communications circuitry (including wireless communications) and storage media. Certain embodiments include a computer-readable storage medium having embodied thereon a program executable by a processor configured to perform a method.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
receiving data associated with a plurality of samples, the samples including one or more events, at least some of the samples including a plurality of events;
selecting an upper co-occurrence threshold;
calculating $E(i,i)$, a first number of samples in which a first event EventID(i) occurs;
calculating $E(j,j)$, a second number of samples in which a second event EventID(j) occurs;
calculating $E(i,j)$, a third number of samples in which the first event EventID(i) and the second event EventID(j) occur together;
selecting at least two events EventID(i) and EventID(j) for which $E(i,j)$ divided by the lesser of $E(i,i)$ and $E(j,j)$ is at or above the upper co-occurrence threshold; and
assigning at least one of EventID(i) and Event ID(j) to a first trait T1.

2. The method of claim 1, further comprising associating first trait T1 with a sample and recording the association.

3. The method of claim 1, further comprising associating first trait T1 with a sample in which at least one of EventID(i) and EventID(j) occurs.

4. The method of claim 1, further comprising associating first trait T1 with a sample in which EventID(i) and EventID (j) occur.

5. The method of claim 1, wherein the upper co-occurrence threshold is at least 0.9.

6. The method of claim 1, wherein $E(i,j)$ equals the lesser of $E(i,i)$ and $E(j,j)$.

7. The method of claim 1, wherein $E(i,j)$ divided by $E(i,i)$ is at or above the upper co-occurrence threshold and $E(i,j)$ divided by $E(j,j)$ is at or above the upper co-occurrence threshold.

8. The method of claim 1, wherein selecting an EventID(i) includes, for two or more values of EventID(i):
selecting a range of values of a third event EventID(k);

calculating E(i,k), a fourth number of samples in which the first event EventID(i) and the third event EventID(k) occur together;
calculating a standard deviation of the values of E(i,k), over the selected range of values of EventID(k);
choosing an EventID(i) from the two or more values of EventID(i) for which the standard deviation of E(i,k) is a maximum;
associating the chosen EventID(i) with a nucleus of a trait; and
recording the association.

9. The method of claim 8, further comprising:
for two or more values of EventID(i):
dividing the standard deviation of E(i,k) by E(i,i) to yield a normalized standard deviation; and
choosing an EventID(i) for which the normalized standard deviation of E(i,k) is a maximum.

10. The method of claim 1, further comprising selecting an event frequency threshold, and wherein at least one of the selected EventID(i) and EventID(j) occur in the plurality of samples at a frequency greater than the event frequency threshold.

11. The method of claim 1, further comprising selecting an event frequency threshold, and wherein at least one of the selected EventID(i) and EventID(j) occur in the plurality of samples at a frequency less than the event frequency threshold.

12. The method of claim 1, further comprising:
selecting a lower co-occurrence threshold;
calculating E(k,k), a fourth number of samples in which a third event EventID(k) occurs;
calculating E(i,k), a fifth number of samples in which EventID(i) and EventID(k) occur together;
selecting an EventID(k) for which E(i,k) divided by the lesser of E(i,i) and E(k,k) is at or below the lower co-occurrence threshold; and
assigning the selected EventID(k) to a second trait T2.

13. The method of claim 12, further comprising:
calculating E(j,k), a sixth number of samples in which EventID(j) and EventID(k) occur together;
selecting an EventID(k) for which E(j,k) divided by the lesser of E(j,j) and E(k,k) is at or below the lower co-occurrence threshold; and
assigning the selected EventID(k) to the second trait T2.

14. The method of claim 1, further comprising matching first trait T1 to at least a portion of a known pattern.

15. The method of claim 14, wherein the pattern includes a diffraction pattern.

16. The method of claim 1, wherein a sample includes a person.

17. The method of claim 1, wherein an event includes a link in a network.

18. The method of claim 1, wherein an event includes a price.

19. The method of claim 1, wherein an event includes a keyword.

20. The method of claim 1, wherein an event includes nucleic acid.

21. The method of claim 1, further comprising presenting an advertisement associated with the first trait T1 to a user.

22. A method comprising:
receiving data associated with a plurality of samples, the samples including one or more events;
determining one or more of the traits, using a routine comprising:
selecting an upper co-occurrence threshold
calculating a number of samples in which a first event and a second event occur in the same sample; and
assigning the first and second events to a first trait when the first and second events occur in the same sample at a frequency that is above the upper co-occurrence threshold.

23. A method comprising:
receiving data associated with a plurality of samples, the samples including one or more events;
determining one or more of the traits, using a routine comprising:
selecting a lower co-occurrence threshold
calculating a number of samples in which a first event and a second event occur together; and
assigning the first event to a first trait and the second event to a second trait when the first and second events occur together at a frequency that is below the lower co-occurrence threshold.

* * * * *